United States Patent Office
2,987,681
Patented June 6, 1961

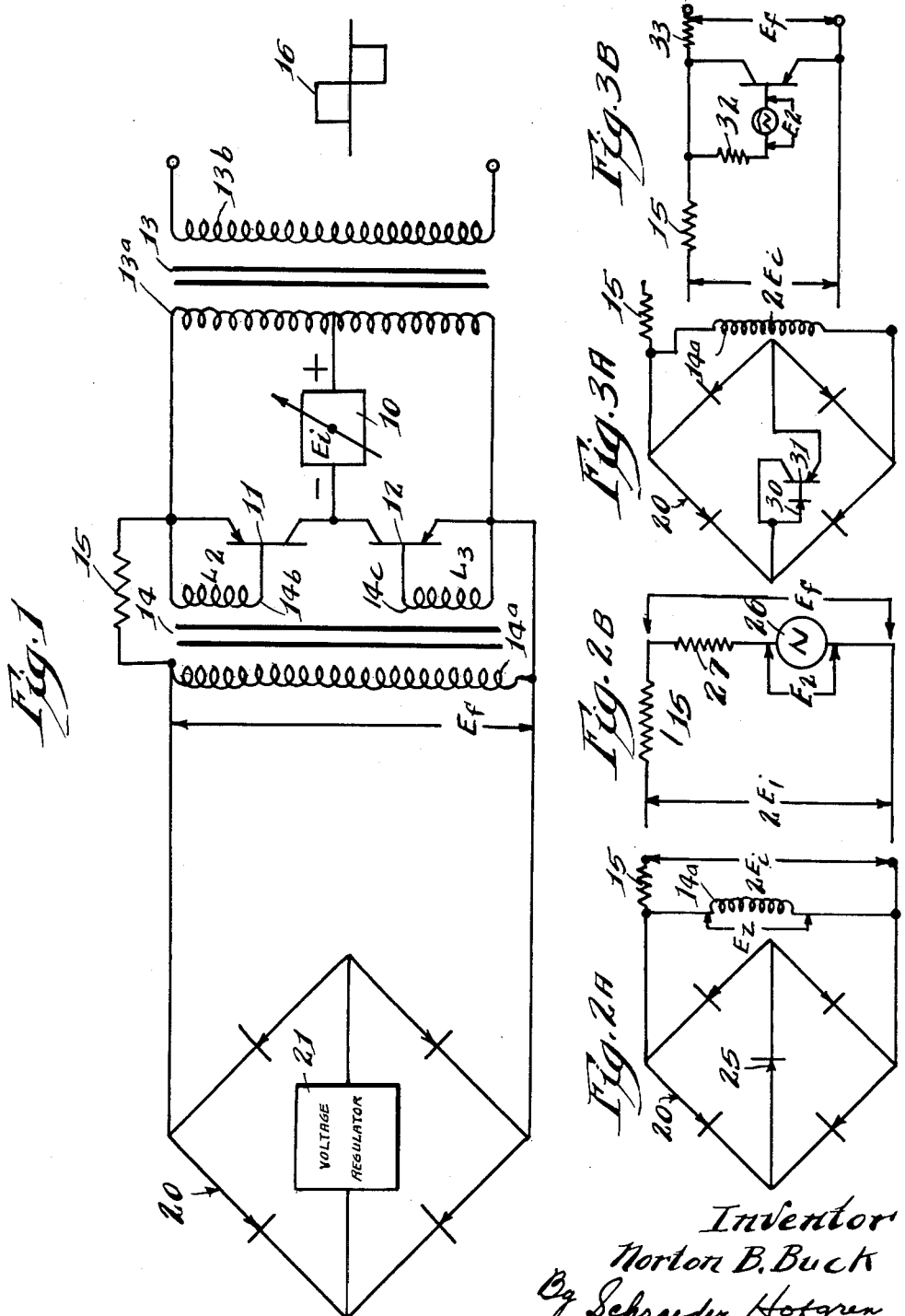

2,987,681
REGULATED INVERTER
Norton B. Buck, Pacific Palisades, Calif., assignor to Sundstrand Corporation, a corporation of Illinois
Filed Oct. 2, 1958, Ser. No. 764,843
3 Claims. (Cl. 331—113)

This invention relates to a static transistor circuit for converting direct current to alternating current, and more particularly to a static inverter having a control circuit for regulating the frequency of the alternating current output.

Previously known transistor power inverter circuits have been subject to severe frequency variation primarily as a result of variation in the voltage of the direct current power source.

It is a principal object of the present invention to provide a transistor power inverter with control circuitry for stabilizing the frequency of the alternating current output signal.

One object of the invention is the provision of a power inverter circuit comprising a source of direct current power, switching transistor means connected with the source, an alternating current output circuit connected with the transistor means, a feedback circuit, and means for controlling the feedback circuit to regulate the frequency of the alternating current in the output circuit. Another object is that a variable impedance is connected in shunt with a portion of the feedback circuit for regulating the output frequency.

A further object is the provision of such a circuit with a feedback circuit including a rectifier and a variable impedance shunt voltage regulator connected with the rectifier, for controlling the feedback circuit.

Yet another object is the provision of an inverter circuit with a pair of switching transistors connected to the source of direct current power, a transformer having windings connected with the transistors, and a feedback winding, a rectifier connected with the feedback winding and a variable impedance shunt voltage regulator connected with the rectifier.

Further objects and advantages will become apparent from the following detailed description taken in connection with the accompanying drawings, in which:

FIGURE 1 is a circuit diagram, partially in block form, of an embodiment of the invention;

FIGURE 2A is a fragmentary schematic diagram of one embodiment of a control circuit;

FIGURE 2B is a schematic drawing of the equivalent electrical circuit of FIGURE 2A;

FIGURE 3A is a fragmentary schematic drawing of another control circuit; and

FIGURE 3B is a schematic drawing of the equivalent electrical circuit of FIGURE 3A.

While this invention is susceptible of embodiments in many different forms, there is shown in the drawings and will herein be described in detail an embodiment of the invention and a modification thereof with the understanding that the present disclosure is to be considered as an exemplification of the principles of the invention and is not intended to limit the invention to the embodiment illustrated. The scope of the invention will be pointed out in the appended claims.

In the embodiment of the invention illustrated in FIGURE 1 of the drawing, a source of direct current power having a potential $E_1$, is indicated at 10. A pair of switching transistors 11 and 12 have their collector electrodes connected with one terminal of the direct current source 10 and their emitter electrodes connected to the terminals of primary winding 13a of output transformer 13. A center tap on winding 13a is connected to the other terminal of direct current source 10.

A feedback transformer 14 has a winding 14a connected through feedback resistor 15 (sometimes designated $R_f$) across the primary winding 13a of the output transformer. Driving coils 14b and 14c on the feedback transformer are connected between the base and the emitter electrodes of switching transistors 11 and 12, respectively.

Operation of the circuit is initiated upon connection of the direct current voltage source as shown. It can be assumed that the physical characteristics of the transistors 11 and 12 are not identical so that the initial leakage current passed by the two transistors is not equal. If transistor 11 passes a larger leakage current than transistor 12, the difference in currents establishes a voltage across winding 13a which is coupled through winding 14a and transformer 14 to windings 14b and 14c. The polarity of the windings in this feedback loop is such that transistor 11 is rendered fully conductive and transistor 12 nonconductive. As the current through winding 14a increases, the core of transformer 14 is saturated, whereupon the polarity of the voltages applied to the transistors 11 and 12 reverses, rendering transistor 12 conductive and transistor 11 nonconductive. This action repeats at a repetition rate or frequency determined by certain parameters of the circuit, as will appear. An alternating current output, here illustrated in idealized form as a square wave 16, appears across the secondary winding 13b of the output transformer.

It can be shown that the frequency of operation of the inverter circuit is expressed by the formula $$f = \frac{E_f 10^8}{4\beta N_f A_c}$$

where $f$ is the frequency in cycles per second, $E_f$ is the feedback voltage across winding 14a, $\beta$ is the saturation flux density of the core of transformer 14, $N_f$ is the number of turns in winding 14a and $A_c$ is the area of the core of transformer 14 in cm.² It can further be shown that $E_f$ is a function of the potential $E_1$ of the direct current power source 10, the characteristics of transistors 11 and 12 and of windings 14a, 14b and 14c of transformer 14. Accordingly, the frequency of operation of the circuit may be expressed as a constant times the feedback voltage $E_f$. Thus, if variations in the feedback voltage are minimized, the fluctuations of the output frequency will be minimized.

In FIGURE 1, a full wave rectifier 20 is connected across feedback winding 14a and has a direct current voltage regulator 21 connected across its output terminals. This voltage regulator circuit is effectively a variable impedance shunted across the feedback winding 14a, and serves to stabilize the feedback voltage $E_f$ and thus to reduce variations in the frequency of the alternating current output signal 16 with variations in the potential $E_1$ from direct current power source 10.

Turning now to FIGURE 2, comprising portions 2A and 2B, a specific embodiment of a suitable voltage regulator is illustrated. A zener diode 25 serves as the voltage regulator and is connected in shunt with feedback winding 14a, through rectifier 20. The equivalent electrical circuit for FIGURE 2A is shown in FIGURE 2B, with the zener diode indicated as a voltage generator 26 (whose voltage $E_z$ is the zenor voltage of the diode) and an A.C. output resistance 27 (sometimes designated $r_d$). From the circuit of FIGURE 2B, the feedback voltage, $$E_f = \frac{2E_{ird}}{R_f + r_d} + \frac{E_z R_f}{R_f + r_d}$$

Differentiating this equation, $$\frac{dE_f}{dE_i} = \frac{2r_d}{R_f + r_d}$$

Thus, the variation in $E_f$ with changes in $E_i$ approach zero as the value of $r_d$ approaches zero; and if $R_f$ is very much greater than $r_d$, the value of the derivative will be quite small. In a typical circuit, $r_d$ (resistor 27) may have a value of 10 ohms and $R_f$ (resistor 15) a value of the order of several hundred ohms. Obviously, the value of the derivative and thus the frequency variation, are small.

Another form of regulator is illustrated in FIGURES 3A and 3B, and comprises a zener diode 30 in conjunction with a transistor 31. The collector-emitter circuit of the transistor is connected directly across the output terminals of full wave rectifier 20 while the zener diode 30 is connected in the base circuit of the transistor. In the equivalent circuit for this connection, the diode resistance, $r_d$ is indicated at 32 and the effective output resistance of the circuit, $R_o$, at 33. It can be shown for this circuit that the output impedance $$R_o = \frac{r_d}{A_i}$$

where $A_i$ is the current gain of the transistor; and that $E_f$ is equal to $E_z$, the zener voltage of diode 30. By the nature of the zener diode, $E_z$ remains substantially constant, controlling $E_f$.

Suitable component values for a typical operating circuit will now be described. It is to be understood that this specific information of the invention is given solely for the purpose of disclosing an operative embodiment of the invention and that the components used are subject to a wide range of variations, as will be apparent to those skilled in the art. For a nominal value of $E_t$, the direct current power source, of 28 volts, power transistors type 2N174 may be used. Assuming an output frequency of 114 c.p.s., the feedback transformer 14 has a winding 14a of 660 turns and windings 14b and 14c of 235 turns each. The feedback resistor, 15, has a value of 330 ohms, and current limiting resistors are necessary in the base circuits of transistors 11 and 12, each having a value of 24 ohms. The area of the core of transformer 14 is 0.171 cm.² and it has a maximum flux density of 15,500 gauss per cm.². The feedback voltage, $E_f$, is 8 volts.

In the voltage regulator portion of the circuit, an 8 volt zener diode 1N430B is used in conjunction with a 2N68 power transistor.

I claim:

1. A regulated direct current to alternating current static transistor power inverter of the character described, comprising: a source of direct current power; a pair of switching transistors each having collector, emitter and base elements; an output transformer having two primary winding portions each connected with said source through the collector-emitter circuit of one of said transistors; a feed-back transformer having a primary winding connected across with said output transformer, and a pair of secondary winding portions one connected with the base of each of said transistors; and a voltage regulator connected across the primary winding of said feed-back transformer.

2. A regulated direct current to alternating current static transistor power inverter of the character described, comprising: a source of direct current power; a pair of switching transistors each having collector, emitter and base elements; an output transformer having two primary winding portions each connected with said source through the collector-emitter circuit of one of said transistors; a feed-back transformer having a primary winding connected with said output transformer, and a pair of secondary winding portions one connected with the base of each of said transistors; a rectifier having input terminals connected across the primary winding of said feed-back transformer and having output terminals; and a direct current voltage regulator connected with the output terminals of said rectifier.

3. A regulated direct current to alternating current static transistor power inverter of the character described, comprising: a source of direct current power; a pair of switching transistors each having collector, emitter and base elements; an output transformer having two primary winding portions each connected with said source through the collector-emitter circuit of one of said transistors; a feed-back transformer having a primary winding connected across the primary winding of said output transformer and a pair of secondary winding portions one connected with the base of each of said transistors; a full wave, bridge-type rectifier having input terminals connected across the primary winding of said feed-back transformer, and having output terminals; and a direct current voltage regulator connected with the output terminals of said full wave rectifier.

References Cited in the file of this patent

UNITED STATES PATENTS

| 2,704,330 | Marker | Mar. 15, 1955 |
| 2,774,878 | Jensen | Dec. 18, 1956 |
| 2,874,293 | McMurren | Feb. 17, 1959 |

OTHER REFERENCES

"An Amplitude Stabilized Transistor Oscillator," by Kretzmer, published in Proc. of IRE, vol. 42, pp. 391-401, February 1954.